(12) United States Patent
Shin et al.

(10) Patent No.: US 11,114,698 B2
(45) Date of Patent: Sep. 7, 2021

(54) METHOD OF PREPARING POUCH TYPE SECONDARY BATTERY

(71) Applicant: LG CHEM, LTD., Seoul (KR)

(72) Inventors: Won Kyung Shin, Daejeon (KR); Jae Won Lee, Daejeon (KR); Kyoung Ho Ahn, Daejeon (KR); Chui Haeng Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/766,324

(22) PCT Filed: Mar. 22, 2019

(86) PCT No.: PCT/KR2019/003403
§ 371 (c)(1),
(2) Date: May 22, 2020

(87) PCT Pub. No.: WO2019/190128
PCT Pub. Date: Oct. 3, 2019

(65) Prior Publication Data
US 2020/0365933 A1 Nov. 19, 2020

(30) Foreign Application Priority Data

Mar. 26, 2018 (KR) .................. 10-2018-0034688
Mar. 21, 2019 (KR) .................. 10-2019-0032175

(51) Int. Cl.
| H01M 4/82 | (2006.01) |
| H01M 10/058 | (2010.01) |
| H01M 4/04 | (2006.01) |
| H01M 10/04 | (2006.01) |
| H01M 10/0565 | (2010.01) |
| H01M 10/44 | (2006.01) |

(52) U.S. Cl.
CPC ....... *H01M 10/058* (2013.01); *H01M 4/0447* (2013.01); *H01M 10/049* (2013.01); *H01M 10/0565* (2013.01); *H01M 10/446* (2013.01); *H01M 2300/0085* (2013.01)

(58) Field of Classification Search
CPC ........... H01M 10/058; H01M 10/0565; H01M 10/446; H01M 10/049; H01M 4/0447; H01M 2300/0085
See application file for complete search history.

(56) References Cited

U.S. PATENT DOCUMENTS

| 8,778,531 | B2 * | 7/2014 | Lee | ................ | H01M 10/0587 |
| | | | | | 429/185 |
| 9,184,421 | B2 * | 11/2015 | Park | ................ | H01M 50/116 |
| 10,347,896 | B2 * | 7/2019 | Robert | ................ | H01M 50/10 |
| 2013/0244095 | A1 | 9/2013 | Min et al. | | |
| 2015/0079480 | A1 | 3/2015 | Ahn et al. | | |
| 2015/0236335 | A1 | 8/2015 | Chung et al. | | |
| 2015/0280272 | A1 | 10/2015 | Chung et al. | | |
| 2018/0198111 | A1 | 7/2018 | Hwang | | |
| 2018/0323471 | A1 | 11/2018 | Ahn et al. | | |

FOREIGN PATENT DOCUMENTS

| EP | 2648259 A2 | 10/2013 |
| EP | 3322002 A2 | 5/2018 |
| JP | 3806505 B2 | 8/2006 |
| JP | 2015-056297 A | 3/2015 |
| KR | 10-2002-0019214 A | 3/2002 |
| KR | 10-2014-0008264 A | 1/2014 |
| KR | 10-2014-0018014 A | 2/2014 |
| KR | 10-2014-0059746 A | 5/2014 |
| KR | 10-2015-0049896 A | 5/2015 |
| KR | 10-2016-0038600 A | 4/2016 |
| KR | 10-1626064 B1 | 5/2016 |
| KR | 10-2017-0034774 A | 3/2017 |
| KR | 10-1747909 B1 | 6/2017 |
| KR | 10-2017-0118452 A | 10/2017 |

OTHER PUBLICATIONS

Extended European Search Report issued from the European Patent Office dated Jan. 13, 2021 in the corresponding European patent application No. 19774534.2.
International Search Report (with partial translation) and Written Opinion issued in corresponding International Patent Application No. PCT/KR2019/003403, dated Jun. 20, 2019.

* cited by examiner

*Primary Examiner* — Raymond Alejandro
(74) *Attorney, Agent, or Firm* — Morgan, Lewis & Bockius LLP

(57) ABSTRACT

The present invention relates to a method of preparing a pouch type secondary battery, and particularly to a method of preparing a pouch type secondary battery which includes preparing a pouch type preliminary secondary battery by accommodating an electrode assembly in an inner space of a pouch type case, disposing a metallic ultrasonic member by being closely attached to both surfaces of the pouch type preliminary secondary battery, injecting a composition for a gel polymer electrolyte into the pouch type preliminary secondary battery, applying ultrasonic vibration to the pouch type preliminary secondary battery while pressurizing the pouch type preliminary secondary battery using the ultrasonic member, performing formation on the pouch type preliminary secondary battery, curing the composition for a gel polymer electrolyte, and degassing, wherein the ultrasonic member is maintained at a temperature of 30° C. to 80° C., and the pressurizing of the pouch type preliminary secondary battery is performed while applying a pressure of 0.1 kgf/cm² to 3,000 kgf/cm² per area of the pouch type preliminary secondary battery.

10 Claims, 2 Drawing Sheets

METHOD OF PREPARING POUCH TYPE SECONDARY BATTERY

CROSS-REFERENCE TO RELATED APPLICATIONS

This application claims the benefit of Korean Patent Application Nos. 2018-0034688, filed on Mar. 26, 2018, and 2019-0032175, filed on Mar. 21, 2019, in the Korean Intellectual Property Office, the disclosure of which is incorporated herein in its entirety by reference.

TECHNICAL FIELD

Technical Field

The present invention relates to a method of preparing a pouch type secondary battery having improved electrolyte wetting.

Background Art

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

A lithium secondary battery may be divided into a prismatic type lithium secondary battery and a pouch type lithium secondary battery according to its shape.

With respect to the prismatic type lithium secondary battery, since its shape is fixed, its design is limited, and vent for discharging gas or liquid is not smooth in terms of safety, the prismatic type lithium secondary battery is disadvantageous in that there is a large risk of explosion due to accumulation of heat and gas inside the battery.

In contrast, with respect to the pouch type lithium secondary battery, since it has no limitation in shape and size, is easy to be assembled by heat fusion, and vent for discharging gas or liquid is facilitated when an abnormal behavior occurs, the pouch type lithium secondary battery is advantageous in that safety is high.

The pouch type lithium secondary battery is prepared in such a manner that, after an electrode assembly, in which a porous separator is disposed between a positive electrode and a negative electrode, is inserted into a pouch type case having predetermined size and shape, the electrode assembly is impregnated by injecting an electrolyte including a lithium salt.

The electrode assembly is impregnated while the electrolyte permeates between the positive electrode, the negative electrode, and the separator due to a capillary force, wherein a battery performance may be optimized only when the electrodes constituting the electrode assembly are quickly and completely impregnated with the electrolyte.

However, due to nature of materials, the positive electrode, the negative electrode, and the separator are highly hydrophobic, but, since the electrolyte is a hydrophilic material, a significant amount of time and particular process conditions are required for the electrolyte to sufficiently impregnate the electrode assembly.

Furthermore, since a volume, which may be permeated by the electrolyte, is reduced but a permeation area is increased as a device, such as a secondary battery, gradually becomes larger, the inside of the electrode assembly may not be impregnated with the electrolyte and there is a high possibility that the electrolyte only exists locally on the outside. As a result, a great reduction in capacity and performance of the secondary battery due to uneven distribution of the electrolyte in the secondary battery has emerged as a problem.

Furthermore, a composition for a gel polymer electrolyte having relatively high viscosity has been increasingly used while lithium secondary batteries including a gel polymer electrolyte have recently been commercialized to ensure safety.

Thus, a method for improving wetting of the composition for a gel polymer electrolyte has been required.

Typically, a method of injecting a composition for a gel polymer electrolyte at a high temperature or a method of injecting a composition for a gel polymer electrolyte under a reduced pressure has been proposed to improve the wetting. However, in this case, another problem, such as an internal short circuit, occurs while pre-gelation occurs before a conventional electrode assembly is impregnated with the composition for a gel polymer electrolyte, or the injected composition for a gel polymer electrolyte is modified by heat or pressure.

Therefore, there is a need for a method of preparing a pouch type secondary battery which may improve the wetting of the electrolyte without the modification of the composition for a gel polymer electrolyte.

Prior Art Document: Korean Patent Application Laid-open Publication No. 2014-0059746

DISCLOSURE OF THE INVENTION

Technical Problem

An aspect of the present invention provides a method of preparing a pouch type secondary battery having improved wetting of a composition for a gel polymer electrolyte with respect to an electrode assembly.

Technical Solution

According to an aspect of the present invention, there is provided a method of preparing a pouch type secondary battery which includes:

preparing a pouch type preliminary secondary battery by accommodating an electrode assembly in an inner space of a pouch type case;

disposing a metallic ultrasonic member by being closely attached to both surfaces of the pouch type preliminary secondary battery;

injecting a composition for a gel polymer electrolyte into the pouch type preliminary secondary battery;

applying ultrasonic vibration to the pouch type preliminary secondary battery while pressurizing the pouch type preliminary secondary battery using the metallic ultrasonic member;

performing formation of the pouch type preliminary secondary battery;

curing the composition for a gel polymer electrolyte; and degassing, wherein the metallic ultrasonic member is maintained at a temperature of 30° C. to 80° C., and the pressurizing of the pouch type preliminary secondary battery is performed while applying a pressure of 0.1 kgf/$cm^2$ to 3,000 kgf/$cm^2$ per area of the pouch type preliminary secondary battery.

The metallic ultrasonic member used in the method of the present invention may be formed of a metallic material selected from the group consisting of stainless steel, iron, aluminum, copper, nickel, and alloys of two or more thereof, and may specifically be formed of stainless steel or aluminum.

Also, the metallic ultrasonic member may be formed in a structure surrounding an entire surface of the pouch type preliminary secondary battery.

Furthermore, in the present invention, the metallic ultrasonic member may be maintained at a temperature of 30° C. to 60° C.

Also, in the present invention, the pressurizing of the pouch type preliminary secondary battery may be performed by applying a pressure of 0.1 kgf/cm$^2$ to 500 kgf/cm$^2$, for example, 0.1 kgf/cm$^2$ to 100 kgf/cm$^2$ per area of the pouch type preliminary secondary battery.

Furthermore, the applying of the ultrasonic vibration in the present invention may be performed by applying vibration having a frequency of 20 kHz to 200 MHz.

In this case, the applying of the ultrasonic vibration may be performed simultaneously with the injecting of the composition for a gel polymer electrolyte.

Also, the method of the present invention may further include applying ultrasonic vibration after the formation and before the curing of the composition for a gel polymer electrolyte.

ADVANTAGEOUS EFFECTS

According to a method of the present invention, since a composition for a gel polymer electrolyte is effectively dispersed by applying ultrasonic vibration as well as pressurizing at a temperature of 30° C. or more using a metallic ultrasonic member during or after injection of the composition for a gel polymer electrolyte, wetting of the composition for a gel polymer electrolyte may not only be improved, but wetting time may also be reduced. Accordingly, a pouch type secondary battery having improved initial capacity and a low initial resistance value may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF THE SYMBOLS

Figure 1:
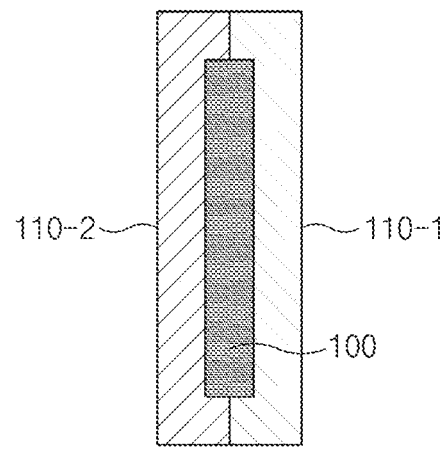
FIG. 1 is a cross-sectional view illustrating a pouch type preliminary secondary battery, on which an ultrasonic member is disposed, in a method of preparing a pouch type secondary battery according to an embodiment of the present invention.

100: Pouch type preliminary secondary battery
110-1: First ultrasonic member
110-2: Second ultrasonic member

MODE FOR CARRYING OUT THE INVENTION

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Hereinafter, a method of preparing a pouch type secondary battery according to an embodiment of the present invention will be described in detail with reference to the accompanying drawings.

Specifically, the method of preparing a pouch type secondary battery according to the embodiment of the present invention includes:

preparing a pouch type preliminary secondary battery by accommodating an electrode assembly in an inner space of a pouch type case;

disposing a metallic ultrasonic member by being closely attached to both surfaces of the pouch type preliminary secondary battery;

injecting a composition for a gel polymer electrolyte into the pouch type preliminary secondary battery;

applying ultrasonic vibration to the pouch type preliminary secondary battery while pressurizing the pouch type preliminary secondary battery using the ultrasonic member;

performing formation of the pouch type preliminary secondary battery;

curing the composition for a gel polymer electrolyte; and degassing, wherein the ultrasonic member is maintained at a temperature of 30° C. to 80° C., and the pressurizing of the pouch type preliminary secondary battery may be performed while applying a pressure of 0.1 kgf/cm$^2$ to 3,000 kgf/cm$^2$ per area of the pouch type preliminary secondary battery.

Preparing Pouch Type Preliminary Secondary Battery

According to the present specification, the pouch type preliminary secondary battery of the present invention includes an electrode assembly and a pouch type case in which the electrode assembly is accommodated, and may be prepared according to a conventional method known in the art.

For example, after an electrode assembly is formed by sequentially stacking a positive electrode, a separator, and a negative electrode, the pouch type preliminary secondary battery of the present invention may be prepared by accommodating the electrode assembly in a pouch type (battery) case.

In this case, since the pouch type case has a sealing portion at each rim, the pouch type preliminary secondary battery may be prepared by first sealing three edges excluding one edge where a composition for a gel polymer electrolyte is injected, after the electrode assembly is accommodated in an inner space.

The electrode assembly may be formed by sequentially stacking the positive electrode and the negative electrode in a state in which the separator is disposed between the positive electrode and the negative electrode to insulate them from each other, and may be formed in various structures such as a jelly-roll type, a stacked type, or a stack and folding type according to an embodiment.

In this case, the positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

Also, the positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 1<Y<1), $LiMn_{2-Z}Ni_ZO_4$ (where 0<Z<2), etc.), lithium-nickel-cobalt-based oxide (e.g., $LiNi_{1-Y1}Co_{Y1}O_2$ (where 0<Y1<1), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_{p1}Co_{q1}Mn_{r2})O_4$ (where 0<p1<2, 0<q1<2, 0<r2<2, and p1+q1+r2=2), etc.), or lithium-nickel-cobalt-transition metal (M) oxide (e.g., $Li(Ni_{p2}Co_{q2}Mn_{r3}MS_2)O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<s2<1, and p2+q2+r3+s2=1), etc.), and any one thereof or a compound of two or more thereof may be included.

The binder is a component that assists in the binding between the active material and the conductive agent and in the binding with the current collector, wherein the binder may commonly be added in an amount of 1 wt % to 30 wt % based on a total weight of solid content in the positive electrode slurry. Examples of the binder may be polyvinylidene fluoride (PVDF), polyvinyl alcohol, carboxymethylcellulose (CMC), starch, hydroxypropyl cellulose, regenerated cellulose, polyvinylpyrrolidone, tetrafluoroethylene, polyethylene, polypropylene, an ethylene-propylene-diene termonomer, a sulfonated ethylene-propylene-diene termonomer, a styrene-butadiene rubber, a fluoro rubber, various copolymers, and the like.

Also, any conductive agent may be used without particular limitation so long as it has suitable conductivity without causing adverse chemical changes in the battery, and may be added in an amount of 1 wt % to 20 wt % based on the total weight of the solid content in the positive electrode slurry. For example, carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; conductive powder, such as fluorocarbon powder, aluminum powder, and nickel powder, may be used as the conductive agent.

The solvent may include an organic solvent, such as N-methyl-2-pyrrolidone (NMP), and may be used in an amount such that desirable viscosity is obtained when the positive electrode active material as well as selectively the binder and the conductive agent is included. For example, the solvent may be included in an amount such that a concentration of the solid content in the slurry including the positive electrode active material as well as selectively the binder and the conductive agent is in a range of 10 wt % to 60 wt %, for example, 20 wt % to 50 wt %.

Also, the positive electrode may include a positive electrode collector region where the positive electrode active material layer is not formed, that is, a positive electrode uncoated portion, and a positive electrode tab formed of a metallic material, such as aluminum (Al), may be bonded to one side end of the positive electrode uncoated portion of the positive electrode.

Furthermore, the negative electrode may be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used.

Also, the negative electrode active material may include at least one selected from the group consisting of lithium metal, a carbon material capable of reversibly intercalating/deintercalating lithium ions, metal or an alloy of lithium and the metal, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

The material, which may be doped and undoped with lithium, may include Si, $SiO_x$ (0<x≤2), Sn, or $SnO_2$, and a mixture of $SiO_2$ and at least one thereof may also be used.

The transition metal oxide may include lithium-containing titanium composite oxide (LTO), vanadium oxide, and lithium vanadium oxide.

Materials, which are the same or different from those of the binder and the conductive agent used in the positive electrode material mixture layer as described above, may be used for the binder and the conductive agent, respectively.

Furthermore, the solvent may include water or an organic solvent, such as NMP and alcohol, and may be used in an amount such that desirable viscosity is obtained when the negative electrode active material as well as selectively the binder and the conductive agent is included. For example, the solvent may be included in an amount such that a concentration of the solid content in the slurry including the negative electrode active material as well as selectively the binder and the conductive agent is in a range of 50 wt % to 75 wt %, for example, 50 wt % to 65 wt %.

Also, a negative electrode collector region where the negative electrode active material layer is not formed, that is, a negative electrode uncoated portion may be formed at both side portions of the negative electrode. A negative electrode tab formed of a metallic material, such as nickel (Ni), may be bonded to one side end of the negative electrode.

The positive electrode tab and the negative electrode tab each extend from the electrode assembly, and portions or all of the positive electrode tab and the negative electrode tab may be connected to a positive electrode lead and a negative electrode lead, respectively, for electrical connection with an external terminal or device. The positive electrode lead and the negative electrode lead are electrically connected to the electrode tabs by welding or the like, and portions of the leads may be exposed to the outside of the battery case. In the battery case, the positive electrode lead and the negative electrode lead may be disposed in opposite directions to each other, or may be disposed side by side in the same direction.

The separator is disposed between the positive electrode and the negative electrode to electrically insulate the positive electrode and the negative electrode from each other, and the separator may be formed in the form of a porous film so that lithium ions may pass between the positive electrode and the negative electrode. The separator, for example, may be composed of a porous membrane using polyethylene (PE), polypropylene (PP), or a composite film thereof.

Disposing Ultrasonic Member by Being Closely Attached

Also, according to the present specification, a metallic ultrasonic member surrounding an entire surface of the pouch type preliminary secondary battery may be disposed by being closely attached to both surfaces of the pouch type preliminary secondary battery prepared as described above.

FIG. 1 is a cross-sectional view illustrating a pouch type preliminary secondary battery 100 on which an ultrasonic member is closely attached and disposed in the method of preparing a pouch type secondary battery according to the embodiment of the present invention.

Referring to FIG. 1, in the method of the present invention, the ultrasonic member surrounding the entire surface of the pouch type preliminary secondary battery may be disposed by being closely attached to both surfaces of the pouch type preliminary secondary battery 100 accommodating the electrode assembly.

In this case, the ultrasonic member may be a pair of ultrasonic members composed of a first ultrasonic member 110-1 and a second ultrasonic member 110-2 which are independently separated as illustrated in FIG. 1, or may be an integrated ultrasonic member in which at least one surface of the first ultrasonic member and at least one surface of the second ultrasonic member are bonded.

Also, instead of using an adhesive member, it is desirable that the ultrasonic member is in contact with a side of the case of the pouch type preliminary secondary battery to facilitate transmission of ultrasonic vibration.

It is desirable that the ultrasonic member is formed of a metallic material to facilitate control of temperature and pressure. The metallic material may include at least one selected from the group consisting of stainless steel, iron, aluminum, copper, nickel, and alloys of two or more thereof. Specifically, the ultrasonic member may be formed of stainless steel or aluminum, for example, aluminum in consideration of cost and heat transfer efficiency.

In the method of the present invention, it is desirable that the ultrasonic member is maintained at a temperature of 30° C. to 80° C., for example, 30° C. to 60° C. by using a temperature control device (not shown) including a hear wire which is coupled to a portion of the ultrasonic member.

Since the temperature of the ultrasonic member is maintained within the above temperature range, an impregnation effect may be improved during the subsequent injection of the composition for a gel polymer electrolyte and it is possible to prevent an internal temperature of the pouch type secondary battery from being excessively increased when the ultrasonic vibration is applied or to prevent occurrences of exfoliation and damage of an internal material, such as the electrode active material, due to the application of ultrasonic waves. In a case in which the temperature of the ultrasonic member is less than 30° C., since viscosity of the composition for a gel polymer electrolyte is increased during the subsequent injection of the composition for a gel polymer electrolyte, wetting may be reduced, and if the temperature of the ultrasonic member is greater than 80° C., since an increase in the internal temperature of the pouch type secondary battery causes damage due to chemical and physical side reactions between the composition for a gel polymer electrolyte and the electrode or separator during the subsequent injection of the composition for a gel polymer electrolyte, an internal short circuit of a cell may occur.

Injecting Composition for Gel Polymer Electrolyte

Also, according to the present specification, after disposing the ultrasonic member surrounding the entire surface of the pouch type preliminary secondary battery by being closely attached to both surfaces of the pouch type preliminary secondary battery, a composition for a gel polymer electrolyte may be injected into a pouch type case accommodating the electrode assembly through the one edge of the pouch type case in an opened state.

In this case, a surface on which an inlet of the composition for a gel polymer electrolyte is formed is adjacent to a surface of the sealing portion on which the negative electrode tab and the positive electrode tab are disposed, but it is desirable that these surfaces are different from each other.

One including (a) a lithium salt, (b) an organic solvent, (c) a polymerizable monomer, (d) a polymerization initiator, and selectively (e) an additive may be used as the composition for a gel polymer electrolyte used in the method of preparing a secondary battery of the present invention.

In this case, any lithium salt typically used in a gel polymer electrolyte may be used as (a) the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $ClO_4^-$, $BF_4^-$, $B_{10}Cl_{10}^-$, $PF_6^-$, $CF_3SO_3^-$, $CH_3CO_2^-$, $CF_3CO_2^-$, $AsF_6^-$, $SbF_6^-$, $AlCl_4^-$, $AlO_4^-$, $CH_3SO_3^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $C_4F_9SO_3^-$, $CF_3CF_2SO_3^-$, $(FSO_2)_2N^-$, $(CF_3SO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $SCN^-$, and $(CF_3CF_2SO_2)_2N^-$ as an anion.

Specifically, the lithium salt may include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, $LiCH_3SO_3$, lithium fluorosulfonyl imide (LiFSI, $LiN(SO_2F)_2$), lithium (bis)trifluoromethanesulfonimide (LiTFSI, $LiN(SO_2CF_3)_2$), and lithium bisperfluoroethanesulfonimide (LiBETI, $LiN(SO_2C_2F_5)_2$), or a mixture of two or more thereof. More specifically, the lithium salt may include a single material selected from the group consisting of $LiBF_4$, $LiPF_6$, LiCH₃CO₂, LiCF₃CO₂, LiCH₃SO₃, LiFSI, LiTFSI, and LiBETI, or a mixture of two or more thereof. In addition to these materials, lithium salts commonly used in an electrolyte for a lithium secondary battery may be used without limitation.

The lithium salt may be appropriately changed in a normally usable range but may be included in a concentration of 0.8 M to 4.0 M, for example, 1.0 M to 3.0 M in the composition for a gel polymer electrolyte to obtain an optimum effect of forming a film for preventing corrosion of a surface of the electrode.

In a case in which the concentration of the lithium salt is less than 0.8 M, an effect of improving low-temperature output and cycle characteristics during high-temperature storage of the lithium secondary battery is insignificant, and, in a case in which the concentration of the lithium salt is greater than 4.0 M, the wetting of the composition for a gel polymer electrolyte may be reduced due to an increase in the viscosity of the composition for a gel polymer electrolyte.

Also, (b) the organic solvent is not limited as long as it is a non-aqueous organic solvent which may minimize decomposition due to an oxidation reaction during charge and discharge of the secondary battery and may exhibit desired characteristics with the additive. For example, a carbonate-based solvent, an ether-based solvent, or an ester-based solvent may be used alone or in a mixture of two or more thereof.

The carbonate-based solvent among the organic solvents may include a cyclic carbonate-based solvent or a linear carbonate-based solvent.

Specific examples of the cyclic carbonate-based solvent may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a solvent of two or more thereof.

Also, the linear carbonate-based solvent may include any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a solvent of two or more thereof.

The ether-based solvent may include any one selected from the group consisting of dimethyl ether, diethyl ether, dipropyl ether, methylethyl ether, methylpropyl ether, and ethylpropyl ether, or a solvent of two or more thereof.

Furthermore, the ester-based solvent may include a linear ester-based solvent and a cyclic ester-based solvent, and, specific examples of the linear ester-based solvent among these ester-based solvents may be any one selected from the group consisting of methyl acetate, ethyl acetate, propyl acetate, methyl propionate, ethyl propionate, propyl propionate, and butyl propionate, or a solvent of two or more thereof.

Specific examples of the cyclic ester-based solvent may be γ-butyrolactone, γ-valerolactone, γ-caprolactone, σ-valerolactone, or ε-caprolactone.

Also, (c) the polymerizable monomer may include a multifunctional acrylate-based compound containing at least one acrylate group in the molecule, a multifunctional methacrylate-based compound containing at least one methacrylate group, or compounds having a polymerizable functional group selected from the group consisting of a vinyl group, an epoxy group, an ether group, an allyl group, an oxyalkylene group, and a (meth)acrylic group so that the polymerizable monomers may be polymerized with each other to form a polymer.

Specifically, the polymerizable monomer may include a compound represented by Formula 1 below.

$$A\text{-}B\text{-}A'$$ [Formula 1]

In Formula 1,

A and A' are each independently an acrylate group, a methacrylate group, an alkylene group having 1 to 10 carbon atoms which contains at least one acrylate group or methacrylate group, or —O—R₁, wherein R₁ is an alkyl group having 1 to 10 carbon atoms which contains at least one acrylate group or methacrylate group, or —O—R₂—O—R₃, wherein R₂ is an alkylene group having 1 to 10 carbon atoms which contains at least one acrylate group or methacrylate group, and R₃ is an alkyl group having 1 to 10 carbon atoms which contains at least one acrylate group or methacrylate group and B is an oxyalkylene group.

Specifically, A and A' may each independently include at least one selected from units represented by Formulae A-1 to A-5 below.

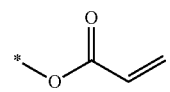
[Formula A-1]

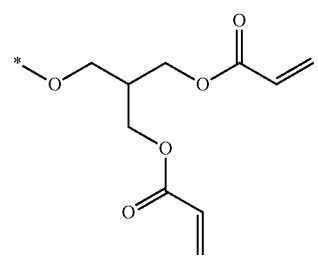
[Formula A-2]

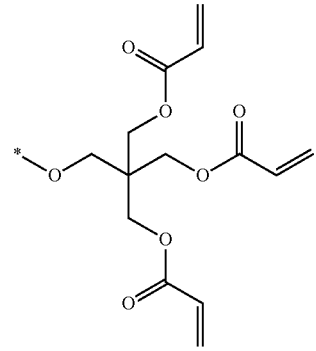
[Formula A-3]

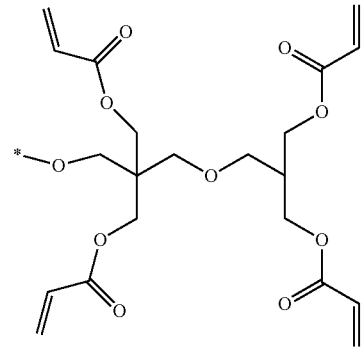
[Formula A-4]

[Formula A-5]

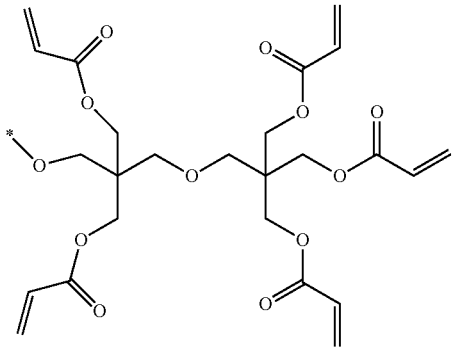

The acrylate group or methacrylate group located at an end of the polymerizable monomer may form a polymer network by a polymerization reaction with an organic binder containing an ethylenically unsaturated group. These compounds may be derived from monomers containing a monofunctional or multifunctional acrylate group or methacrylate group.

Also, B may include a unit represented by Formula B-1 below.

[Formula B-1]

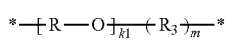

In Formula B-1,
R is an alkylene group having 1 to 10 carbon atoms,
$R_3$ is O or an alkylene group having 1 to 5 carbon atoms,
k1 is an integer of 1 to 30, and
m is an integer of 0 to 3.
For example, in Formula B-1, R may each independently be —$CH_2CH_2$— or —$CH_2CH_2CH_2$—.

More specifically, the compound represented by Formula 1 may be represented by Formula 1a below.

[Formula 1a]

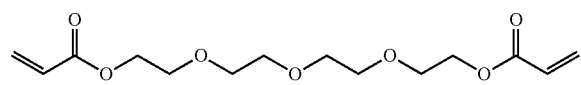

The polymerizable monomer may be included in an amount of 0.5 wt % to 20 wt %, particularly 0.7 wt % to 15 wt %, and more particularly 1.0 wt % to 10 wt % based on a total weight of the composition for a gel polymer electrolyte.

In a case in which the amount of the polymerizable monomer is 0.5 wt % or more, an effect of gel formation reaction may be improved to secure sufficient mechanical strength of the gel polymer electrolyte, and, in a case in which the amount of the polymerizable monomer is 20 wt % or less, it is possible to prevent disadvantages such as an increase in resistance due to the excessive amount of oligomer and limitations in movement of lithium ions (decrease in ionic conductivity).

Furthermore, a conventional polymerization initiator known in the art may be used as (d) the polymerization initiator. For example, at least one selected from the group consisting of an ultraviolet (UV) polymerization initiator, a photopolymerization initiator, and a thermal polymerization initiator may be used as the polymerization initiator.

Specifically, as a representative example, the UV polymerization initiator may include at least one selected from the group consisting of 2-hydroxy-2-methylpropiophenone, 1-hydroxy-cyclohexylphenyl-ketone, benzophenone, 2-hydroxy-1-[4-(2-hydroxyethoxy)phenyl]-2-methyl-1-propanone, oxy-phenylacetic acid 2-[2-oxo-2-phenyl-acetoxyethoxy]-ethyl ester, oxy-phenyl-acetic 2-[2-hydroxyethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphosphine oxide, bis(eta 5-2,4-cyclopentadiene-1-yl), bis[2,6-difluoro-3-(1H-pyrrol-1-yl)phenyl]titanium, 4-isobutylphenyl-4'-methylphenyl iodonium, hexafluorophosphate, and methyl benzoylformate.

Also, as a representative example, the photopolymerization initiator or the thermal polymerization initiator may include at least one selected from the group consisting of benzoyl peroxide, acetyl peroxide, dilauryl peroxide, di-tert-butyl peroxide, t-butyl peroxy-2-ethyl-hexanoate, cumyl hydroperoxide, hydrogen peroxide, 2,2'-azobis(2-cyanobutane), 2,2'-azobis(methylbutyronitrile), 2,2'-azobis(iso-butyronitrile) (AIBN), and 2,2'-azobisdimethyl-valeronitrile (AMVN).

The polymerization initiator is a compound capable of forming a radical by being dissociated by UV or heat at 30° C. to 100° C. in the battery or by being dissociated by light at room temperature (5° C. to 30° C.), wherein the polymerization initiator may be used in an amount of 0.1 part by weight to parts by weight based on 100 parts by weight of the polymer A represented by Formula 1. In a case in which the polymerization initiator is included in an amount of 10 parts by weight or less, since polymerization rate may be controlled in the polymer electrolyte, a disadvantage that the unreacted polymerization initiator remains and adversely affects battery performance later may be prevented. Also, since the polymerization reaction between the polymers A represented by Formula 1 may be smoothly performed only when the polymerization initiator is included in an amount of 0.1 part by weight or more, a polymer electrolyte having a uniform thickness may be prepared.

Furthermore, additives commonly used in a gel polymer electrolyte may be used as (e) the additive without limitation, and, as a representative example, at least one selected from vinylene carbonate (VC), propane sultone (PS), succinonitrile (SN), adiponitrile, ethylene sulfate (ESa), 1,3-propene sultone (PRS), fluoroethylene carbonate (FEC), $LiPO_2F_2$, lithium difluorooxalatoborate (LiODFB), lithium bis-(oxalato) borate (LiBOB), tris(trimethylsilyl) phosphate (TMSPa), tris(trimethylsilyl) phosphite (TMSPi), lithium difluoro(bisoxalato)phosphate, lithium difluorophosphate, lithium oxalyldifluoroborate, tris(2,2,2-trifluoroethyl)phosphate (TFEPa), or tris(trifluoroethyl)phosphite (TFEPi) may be included.

In the method of the present invention, after the composition for a gel polymer electrolyte is injected, the opened sealing portions are adhered to each other and sealed, and a subsequent process may then be performed.

That is, since the inlet of the composition for a gel polymer electrolyte is sealed before the application of the ultrasonic vibration, it is possible to prevent volatilization of the gel polymer electrolyte composition or internal contamination of the battery which may occur when the pouch type case is opened.

The sealing may be performed at 130° C. to 160° C. for 1 second to 10 seconds, for example, at 140° C. to 150° C. for 2 seconds to 3 seconds so that polymer layers of the pouch type case may be bonded together.

Applying Ultrasonic Vibration

Also, in the method of the present invention, after the composition for a gel polymer electrolyte is injected, ultrasonic vibration may be applied while pressurizing the pouch type preliminary secondary battery using the ultrasonic member disposed by being closely attached to both sides of the case of the pouch type preliminary secondary battery.

The applying of the ultrasonic vibration may be performed by applying vibration having a frequency of 20 kHz to 200 MHz, for example, 31 kHz to 200 MHz. In a case in which the ultrasonic vibration is performed at a frequency of less than 20 kHz, since the composition for a gel polymer electrolyte injected into the pouch type case is difficult to be decomposed into fine particles, an effect of improving the wetting of the composition for a gel polymer electrolyte may be insignificant. In a case in which the ultrasonic vibration is performed at a frequency of greater than 200 MHz, power consumption may be excessively increased to reduce productivity.

Also, the pouch type preliminary secondary battery may be pressurized at a pressure of 0.1 kgf/cm$^2$ to 3,000 kgf/cm$^2$, particularly 0.1 kgf/cm$^2$ to 500 kgf/cm$^2$, and more particularly 0.1 kgf/cm$^2$ to 100 kgf/cm$^2$, for example, 0.1 kgf/cm$^2$ to 50 kgf/cm$^2$ per area of the pouch type preliminary secondary battery using a hydraulic press or the like while applying the ultrasonic vibration.

In a case in which the pressure within the above range is applied, an effect of dispersing the composition for a gel polymer electrolyte may be further improved. In a case in which the pressure applied is less than 0.1 kgf/cm$^2$ per area of the pouch type preliminary secondary battery, the ultrasonic vibration may be difficult to be transmitted to the inside of the cell, and, in a case in which the pressure applied is greater than 3,000 kgf/cm$^2$ per area of the pouch type preliminary secondary battery, the excessive pressure may be applied to the pouch type secondary battery to cause cell damage.

In the applying of the ultrasonic vibration, a cycle having a rest period of 5 seconds to 10 seconds after the application of the ultrasonic vibration for 5 seconds to 10 seconds is set as one cycle, and the cycle may be repeated about 50 times to about 150 times, for example, about 100 times.

In this case, in the present invention, since the ultrasonic member is formed in the form of completely surrounding the entire surface of the pouch type preliminary secondary battery, the ultrasonic member may not only prevent a heat loss from the inside of the pouch type preliminary secondary battery to more stably maintain the internal temperature of the cell, but may also apply uniform pressure and ultrasonic vibration to the entire surface of the pouch type preliminary secondary battery and improve a working environment by reducing noise generated when the ultrasonic vibration is applied.

In this case, the applying of the ultrasonic vibration in the method of the present invention may be performed simultaneously with the injection of the composition for a gel polymer electrolyte, or may be performed after the injection of the composition for the gel polymer electrolyte is completed and the pouch type case is sealed.

As in the method of the present invention, in a case in which the ultrasonic vibration is applied during or after the injection of the composition for a gel polymer electrolyte, since the viscosity of the composition for a gel polymer electrolyte is reduced and its molecular mobility is improved to facilitate impregnation of electrode plates and separator constituting the electrode assembly, impregnability (wetting) of the composition for a gel polymer electrolyte may be significantly improved. Thus, wetting time of the pouch type secondary battery after the injection of the composition for a gel polymer electrolyte and the resulting preparation time may be reduced.

Particularly, in the method of the present invention, pre-gelation reactivity of the composition for a gel polymer electrolyte may be suppressed by applying the ultrasonic vibration after the composition for a gel polymer electrolyte is injected and the pouch type case is sealed.

In the method of preparing a pouch type secondary battery of the present invention, when the ultrasonic vibration is applied, an exothermic temperature range of the inside of the pouch type preliminary secondary battery caused by the ultrasonic vibration may be controlled using the ultrasonic member.

Performing Formation

In the present specification, performing formation of the pouch type preliminary secondary battery may be performed after the applying of the ultrasonic vibration.

The formation may be performed by charging and discharging at 100 mA to 200 mA to 1.7 V to 4.4 V at 0.05 C to 0.1 C, for example, at 0.05 C to 1.7 V at 70° C. or less.

Also, in the method of the present invention, aging may be further performed, after the formation.

The aging may be performed in a temperature range of 25° C. to 60° C., for example, 30° C. to 40° C. for 1 hour to 72 hours (3 days) or less so that pre-gelation is prevented and the electrodes are sufficiently wetted with the composition for a gel polymer electrolyte.

In the method of the present invention, a sufficient solid electrolyte interface (SEI) may be formed by performing the formation process and the aging process at 70° C. or less, and a side reaction may be prevented by controlling wetting improvement effect and electrolyte salt decomposition reaction.

Furthermore, in the method of the present invention, vacuum wetting may be further preformed to improve the wetting after the aging.

It is desirable that the vacuum wetting is performed by exposing for a short period of time at a vacuum pressure lower than that under a wetting condition conventionally performed, wherein, specifically, the vacuum wetting may be repeated three times while reducing the pressure for 10 seconds to 20 seconds in a vacuum chamber, and more specifically, the vacuum wetting may be repeated three times while reducing the pressure for 15 seconds to 20 seconds.

When the formation is performed in the method of the present invention, large amounts of gas generated from the positive electrode active material and gas generated due to a side reaction between the positive electrode active material and the composition for a gel polymer electrolyte may be generated. If the gases generated in the battery cell are not efficiently removed in the preforming of the formation, the gases may occupy a certain space in the battery cell to prevent uniform formation and adversely affect battery lifetime and battery performance such as capacity and output. Furthermore, the capacity of the battery may be rapidly reduced or the battery cell may be swollen due to the gas remaining in the battery cell as the number of charge and discharge cycles is increased.

Thus, the method of the present invention may further include degassing the gas generated in the performing of the formation by opening some areas of the case, after the formation.

Also, the method of the present invention may further include applying ultrasonic vibration after the degassing.

The applying of the ultrasonic vibration may be performed under the same condition as that of the applying of the ultrasonic vibration described above.

As described above, in the method of the present invention, since dispersibility of the composition for a gel polymer electrolyte is improved by performing the various ultrasonic vibration steps before a curing process for the preparation of the gel polymer electrolyte to increase the wetting, the gel polymer electrolyte may be more uniformly and stably cured.

Curing the Composition for Gel Polymer Electrolyte

In the present specification, curing (gelating) of the composition for a gel polymer electrolyte may be performed after the formation.

The curing (gelating) may be performed by a conventional photocuring process by irradiation with heat, e-beam, or gamma rays.

Specifically, the curing (gelating) may be performed by thermal curing in a temperature range of 30° C. to 70° C., for example, 40° C. to 65° C. for 5 hours to 24 hours under an inert condition.

As described above, if the curing is performed in an inert atmosphere, since the reaction of radicals with oxygen, as a radical scavenger, in the atmosphere is essentially blocked, the extent of reaction may be increased to such an extent that the unreacted oligomer is almost absent. Thus, it is possible to improve a gel conversion rate and prevent performance degradation of the secondary battery caused by a large amount of the unreacted oligomer remaining in the battery. Gas having low reactivity known in the art may be used for the inert atmosphere, and, particularly, at least one inert gas selected from the group consisting of nitrogen, argon, helium and xenon may be used.

The polymerizable monomers may be cross-linked with each other by the curing (gelating) to form a polymer network in the form of a gel, and the electrolyte salt dissociated from the composition for a gel polymer electrolyte may be uniformly impregnated in the polymer network.

Also, the method of the present invention may further include aging at 25° C. to 70° C., for example, 30° C. to 60° C. for 1 hour to 24 hours, after the curing. In the aging process, an additional SEI may be formed by allowing the battery after the completion of the charge and discharge and curing process to be left standing at room temperature for a certain period of time, and, as a result, additional gas generation may be induced.

Degassing

Also, in the specification of the present invention, degassing may be performed after the curing of the composition for a gel polymer electrolyte.

The degassing may be performed while applying a pressure to the battery case. The degassing may be performed at a pressure of −85 kPa to −95 kPa.

Next, the opened area of the pouch type case may be sealed at a temperature of 120° C. to 150° C. for about 2 seconds to about 5 seconds.

As described above, in the present invention, since the ultrasonic member is disposed by being closely attached to the pouch type preliminary secondary battery during the preparation of the pouch type secondary battery and the ultrasonic vibration and the pressure are simultaneously applied after the injection of the composition for a gel polymer electrolyte or simultaneously with the injection of the composition for a gel polymer electrolyte to effectively disperse the composition for a gel polymer electrolyte, the wetting of the composition for a gel polymer electrolyte may be improved. As a result, it is possible to reduce the wetting time during the preparation of the pouch type secondary battery and the resulting preparation costs. Thus, a pouch type secondary battery having improved stability and overall performance may be prepared.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Preparation of Composition for Gel Polymer Electrolyte)

A composition for a gel polymer electrolyte was prepared by adding 5 g of the compound represented by Formula 1a and 0.01 g of dimethyl 2,2'-azobis(2-methylpropionate) (CAS No. 2589-57-3), as a polymerization initiator, to 94.99 g of an organic solvent (ethylene carbonate (EC):ethyl methyl carbonate (EMC)=volume ratio of 3:7) in which 1 M $LiPF_6$ was dissolved.

(Pouch Type Secondary Battery Preparation)

A positive electrode mixture slurry (solid content of 65 wt %) was prepared by adding $LiCoO_2$ as a positive electrode active material, carbon black as a conductive agent, and polyvinylidene fluoride (PVDF), as a binder, at a weight ratio of 94:3:3 to N-methyl-2-pyrrolidone (NMP) as a solvent. An about 20 μm thick aluminum (Al) thin film, as a positive electrode collector, was coated with the positive electrode mixture slurry and dried, and the coated Al thin film was then roll-pressed to prepare a positive electrode.

Subsequently, a negative electrode mixture slurry (solid content of 75 wt %) was prepared by adding carbon powder as a negative electrode active material, PVDF as a binder, and carbon black, as a conductive agent, at a weight ratio of 96:3:1 to NMP as a solvent. A 10 μm thick copper (Cu) thin film, as a negative electrode collector, was coated with the negative electrode mixture slurry and dried, and the coated Cu thin film was then roll-pressed to prepare a negative electrode.

Subsequently, after a 20 μm thick polypropylene (PE) separator was disposed between the above prepared electrodes, wound, and compressed to prepare an electrode assembly, the electrode assembly was inserted into a pouch type battery case to prepare a pouch type preliminary secondary battery.

Subsequently, an ultrasonic member formed of aluminum (Al) surrounding an entire surface of the pouch type preliminary secondary battery was disposed by being closely attached to both surfaces of the pouch type preliminary secondary battery.

The above-prepared composition for a gel polymer electrolyte was injected while a temperature of the ultrasonic member was maintained at 40° C., and an inlet of the composition for gel polymer electrolyte was sealed at 140° C.

Subsequently, a pressure of 5 Kgf/cm² per area of the pouch type preliminary secondary battery was applied using the ultrasonic member, and simultaneously, ultrasonic vibration of 20 KHz was applied for 100 cycles (1 cycle: 5 seconds ultrasonic vibration/5 seconds rest).

Subsequently, after a formation process was performed for 3 hours at 0.1 C and 200 mA, aging was performed at room temperature for 2 days, and a curing process was performed at 65° C. for 5 hours to prepare a gel polymer electrolyte.

Subsequently, degassing was performed while applying a pressure of −85 kPa to remove gas generated from the inside of the pouch type preliminary secondary battery, and thus, a pouch type secondary battery of the present invention was prepared.

Example 2

A composition for gel polymer electrolyte was injected while a temperature of an ultrasonic member was maintained at 40° C. during the preparation of a pouch type secondary battery, and an inlet of the composition for gel polymer electrolyte was sealed at 140° C.

Subsequently, the pouch type secondary battery was prepared in the same manner as in Example 1 except that a pressure of 10 Kgf/cm² per area of a pouch type preliminary secondary battery was applied using the ultrasonic member, and ultrasonic vibration of 25 KHz was applied for 100 cycles (1 cycle: 5 seconds ultrasonic vibration/5 seconds rest).

Comparative Example 1

A pouch type secondary battery was prepared in the same manner as in Example 1 except that, during the preparation of the pouch type secondary battery, a composition for gel polymer electrolyte was injected at room temperature (25° C.), an inlet of the composition for gel polymer electrolyte was sealed at 140° C., and a formation process and a curing process were then performed without performing an ultrasonic process and a pressurization process.

Comparative Example 2

A pouch type secondary battery was prepared in the same manner as in Example 1 except that, during the preparation of the pouch type secondary battery, a composition for gel polymer electrolyte was injected while a temperature of an ultrasonic member was maintained at 40° C., an inlet of the composition for gel polymer electrolyte was sealed at 140° C., and a formation process and a curing process were then performed without performing an ultrasonic process and a pressurization process.

Comparative Example 3

A composition for gel polymer electrolyte was injected while a temperature of an ultrasonic member was maintained at 40° C. during the preparation of a pouch type secondary battery, and an inlet of the composition for gel polymer electrolyte was sealed at 140° C.

Subsequently, the pouch type secondary battery was prepared in the same manner as in Example 1 except that an ultrasonic process was not performed, and a pressure of 5 Kgf/cm² per area of a pouch type preliminary secondary battery was applied using the ultrasonic member.

Comparative Example 4

A pouch type secondary battery was prepared in the same manner as in Example 1 except that, during the preparation of the pouch type secondary battery, a temperature of an ultrasonic member was maintained at room temperature (25° C.)

Comparative Example 5

A pouch type secondary battery was prepared in the same manner as in Example 2 except that, during the preparation of the pouch type secondary battery, a temperature of an ultrasonic member was maintained at room temperature (25° C.)

Comparative Example 6

A pouch type secondary battery was prepared in the same manner as in Example 1 except that, during the preparation of the pouch type secondary battery, a composition for gel polymer electrolyte was injected while a temperature of an ultrasonic member was maintained at 40° C., and ultrasonic vibration of 20 KHz was then applied for 100 cycles (1 cycle: 5 seconds ultrasonic vibration/5 seconds rest) using the ultrasonic member without pressurization.

Comparative Example 7

A pouch type secondary battery was prepared in the same manner as in Example 1 except that, during the preparation of the pouch type secondary battery, a temperature of an ultrasonic member was maintained at 100° C.

Comparative Example 8

A pouch type secondary battery was prepared in the same manner as in Example 1 except that, during the preparation of the pouch type secondary battery, a pressure of 3,500 Kgf/cm² per area of a pouch type preliminary secondary battery was applied using an ultrasonic member during pressurization while a temperature of the ultrasonic member was maintained at room temperature (25° C.)

TABLE 1

| | Ultrasonic member temperature (° C.) | Applied pressure (Kgf/cm²) | Ultrasonic application | Ultrasonic vibration (KHz) |
|---|---|---|---|---|
| Example 1 | 40 | 5 | ○ | 20 |
| Example 2 | 40 | 10 | ○ | 25 |
| Comparative Example 1 | 25 | x | x | x |
| Comparative Example 2 | 40 | x | x | x |
| Comparative Example 3 | 40 | 5 | x | x |
| Comparative Example 4 | 25 | 5 | ○ | 20 |
| Comparative Example 5 | 25 | 10 | ○ | 25 |
| Comparative Example 6 | 40 | x | ○ | 20 |

TABLE 1-continued

| | Ultrasonic member temperature (° C.) | Applied pressure (Kgf/cm²) | Ultrasonic application | Ultrasonic vibration (KHz) |
|---|---|---|---|---|
| Comparative Example 7 | 100 | 5 | ○ | 20 |
| Comparative Example 8 | 25 | 3,500 | ○ | 25 |

EXPERIMENTAL EXAMPLES

Experimental Example 1

Wetting of each of the pouch type secondary batteries including the gel polymer electrolyte, which were respectively prepared in Example 1 and Comparative Example 1, was measured at 25° C. using an alternating current (AC) impedance measurement method. In this case, ionic conductivity was measured in a frequency range of 0.05 Hz to 100 MHz using a VMP3 measurement instrument and 4294A. The results thereof are presented in FIG. 2 below. In this case, in FIG. 2, a horizontal axis represents a real value ($Z_{re}$) of impedance (Z) calculated by an impedance calculation unit, and a vertical axis represents an imaginary value ($Z_{im}$) of the impedance.

Figure 2:
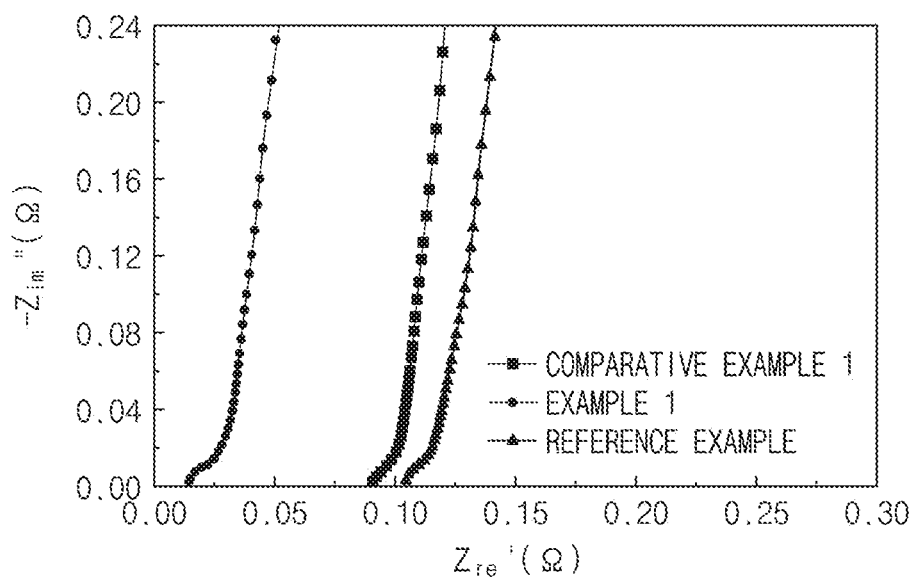
FIG. 2 is graph illustrating resistance evaluation of a pouch type secondary battery according to Experimental Example 1 of the present invention.

Also, Reference Example in FIG. 2 represents an AC impedance measured immediately after the injection of the composition for a gel polymer electrolyte in Example 1.

In general, when the wetting of the composition for a gel polymer electrolyte is increased, since there are less cases where pores in the battery are not impregnated with the composition for a gel polymer electrolyte, resistance is reduced. Thus, when the AC impedance is measured, bulk resistance is measured to be small, and the resistance value constantly converges as the impregnation proceeds.

Referring to FIG. 2, with respect to the pouch type secondary battery of Example 1 in which the applying of the ultrasonic vibration was performed, it may be understood that a bulk resistance value was significantly reduced in comparison to that of the pouch type secondary battery of Comparative Example 1, in which the applying of the ultrasonic vibration was not performed, based on a value of the pouch type secondary battery of Reference Example.

From these results, it may be understood that the wetting of the composition for a gel polymer electrolyte in the battery was improved when the applying of the ultrasonic vibration was performed during the injection of the composition for a gel polymer electrolyte.

Experimental Example 2

Initial Capacity Evaluation

Each of the pouch type secondary batteries prepared in Examples 1 and 2 and the pouch type secondary batteries prepared in Comparative Examples 1 to 8 was charged at a constant current (CC) of 333 mA at a rate of 0.3 C to a voltage of the battery of 4.2 V in a constant current-constant voltage (CC-CV) mode, and cut-off charged at a rate of 0.05 C while maintaining a constant voltage (CV) of 4.2 V after the voltage of the battery reached 4.2 V to perform first charging. A cycle, in which the first charged battery was discharged at a constant current (CC) of 333 mA at a rate of 0.3 C to a voltage of the battery of 3 V, was repeated three times, and third discharge capacity was selected as initial capacity. The results thereof are presented in Table 2 below.

TABLE 2

| | Initial capacity (mAh) |
|---|---|
| Example 1 | 995 |
| Example 2 | 1,000 |
| Comparative Example 1 | 980 |
| Comparative Example 2 | 982 |
| Comparative Example 3 | 985 |
| Comparative Example 4 | 985 |
| Comparative Example 5 | 986 |
| Comparative Example 6 | 983 |
| Comparative Example 7 | 921 |
| Comparative Example 8 | 953 |

Referring to Table 2, with respect to the lithium secondary batteries of Examples 1 and 2, since electrolyte wetting was excellent, it may be understood that initial capacities higher than those of the pouch type secondary batteries prepared in Comparative Examples 1 to 8 were achieved.

Experimental Example 3

Initial Resistance Value Evaluation

Each of the pouch type secondary batteries prepared in Examples 1 and 2 and the pouch type secondary batteries prepared in Comparative Examples 1 to 8 was charged at a constant current (CC) of 333 mA at a rate of 0.3 C to a voltage of the battery of 4.2 V in a constant current-constant voltage (CC-CV) mode, and cut-off charged at a rate of 0.05 C while maintaining a constant voltage (CV) of 4.2 V after the voltage of the battery reached 4.2 V to perform first charging. A cycle, in which the first charged battery was discharged at a constant current (CC) of 333 mA at a rate of 0.3 C to a voltage of the battery of 3 V, was repeated three times, a voltage drop generated when 10 second discharge was performed at a current of 2 A (2 C) was recorded, and direct current (DC) discharge resistance values measured during initial evaluation, which were calculated using R=V/I (Ohm's law), are then presented in Table 3 below. In this case, the DC resistance had a close relationship with output characteristics of the secondary battery.

TABLE 3

| | Resistance (mΩ) |
|---|---|
| Example 1 | 31 |
| Example 2 | 30 |
| Comparative Example 1 | 38 |
| Comparative Example 2 | 37 |
| Comparative Example 3 | 37 |
| Comparative Example 4 | 37 |
| Comparative Example 5 | 36 |
| Comparative Example 6 | 37 |
| Comparative Example 7 | 52 |
| Comparative Example 8 | 47 |

Referring to Table 3, with respect to the pouch type secondary batteries prepared in Examples 1 and 2, since electrolyte wetting was increased and, accordingly, a uniform electrode-electrolyte reaction occurred, it may be understood that internal resistance values were lower than those of the pouch type secondary batteries prepared in Comparative Examples 1 to 8.

The invention claimed is:

1. A method of preparing a pouch secondary battery, the method comprising:
   accommodating an electrode assembly in an inner space of a pouch case to form a pouch preliminary secondary battery;
   disposing a metallic ultrasonic member by being closely attached to both surfaces of the pouch type preliminary secondary battery;
   injecting a composition for a gel polymer electrolyte into the pouch preliminary secondary battery;
   applying ultrasonic vibration to the pouch preliminary secondary battery while pressurizing the pouch preliminary secondary battery using the metallic ultrasonic member;
   performing formation of the pouch preliminary secondary battery;
   curing the composition for a gel polymer electrolyte; and degassing,
   wherein the metallic ultrasonic member is maintained at a temperature of 30° C. to 80° C., and
   the pressurizing of the pouch preliminary secondary battery is performed while applying a pressure of 0.1 kgf/cm$^2$ to 3,000 kgf/cm$^2$ per area of the pouch preliminary secondary battery.

2. The method of claim 1, wherein the metallic ultrasonic member comprises a metallic material selected from the group consisting of stainless steel, iron, aluminum, copper, nickel, and alloys of two or more thereof.

3. The method of claim 1, wherein the metallic ultrasonic member comprises stainless steel or aluminum.

4. The method of claim 1, wherein the metallic ultrasonic member is formed in a structure surrounding an entire surface of the pouch preliminary secondary battery.

5. The method of claim 1, wherein the metallic ultrasonic member is maintained at a temperature of 30° C. to 60° C.

6. The method of claim 1, wherein the pressurizing of the pouch preliminary secondary battery is performed by applying a pressure of 0.1 kgf/cm$^2$ to 500 kgf/cm$^2$ per area of the pouch type preliminary secondary battery.

7. The method of claim 1, wherein the pressurizing of the pouch preliminary secondary battery is performed by applying a pressure of 0.1 kgf/cm$^2$ to 100 kgf/cm$^2$ per area of the pouch type preliminary secondary battery.

8. The method of claim 1, wherein the applying of the ultrasonic vibration comprises applying vibration having a frequency of 20 kHz to 200 MHz.

9. The method of claim 1, wherein the applying of the ultrasonic vibration is performed simultaneously with the injecting of the composition for a gel polymer electrolyte.

10. The method of claim 1, further comprising applying ultrasonic vibration after the formation and before the curing of the composition for a gel polymer electrolyte.

* * * * *

UNITED STATES PATENT AND TRADEMARK OFFICE
CERTIFICATE OF CORRECTION

PATENT NO. : 11,114,698 B2
APPLICATION NO. : 16/766324
DATED : September 7, 2021
INVENTOR(S) : Shin et al.

Page 1 of 1

It is certified that error appears in the above-identified patent and that said Letters Patent is hereby corrected as shown below:

On the Title Page

Item (72) delete "Chui Haeng Lee" and insert -- Chul Haeng Lee --

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*